United States Patent Office 2,787,326
Patented Apr. 2, 1957

2,787,326

REMOVAL OF CALCIUM SULFATE SCALE

William B. Hughes, Tulsa, Okla., assignor to Cities Service Research and Development Company, New York, N. Y., a corporation of New Jersey No Drawing. Application December 31, 1954,
Serial No. 479,233

3 Claims. (Cl. 166—38)

This invention relates to the treatment of oil and gas wells and more particularly to the removal of undesirable calcium sulfate scale which accumulates in oil and gas well tubing, and the producing strata immediately surrounding such well tubing.

The formation of scale is rather wide spread in certain production areas and has been attributed to several causes. One generally accepted theory of scale formation is that of chemical precipitation resulting from the contact of two fluid streams, one of which for example in the case of calcium sulfate scale formation contains sulfate ions, and the other calcium ions. The mixing of these streams at the well bore results in the precipitation of a hard crystalline calcium sulfate deposit which builds up on the well tubing to a point where it would choke off fluid flow in the tube if remedial measures were not undertaken.

Another cause of scale formation is attributed to the precipitation of scale material from supersaturated salt solutions containing the same. When such solutions pass from strata wherein pressures are relatively high into the low pressure area at the well bore, precipitation of the salt on the tubing and surrounding strata occurs.

Experience gained in the treatment of these scale formations has resulted in their classification either as hard or soft scale depending on their chemical composition and physical properties. The hard scales, such as the calcium sulfate scale mentioned above, are generally insoluble in acid and consist largely of the sulfate compounds of barium, calcium, and strontium, either singly or in combination. The so-called soft scales are acid soluble and generally comprise the carbonates of sodium, potassium, calcium, and barium. These scales, similar to the hard scales, may include minor proportions of silica and alumina as well as various metallic oxides and sulfides and other trace materials.

Since the soft or carbonate scales are acid soluble considerable success has been attained in removing these scales by acid treating techniques. Moreover, these scales since they are comparatively soft are readily removable by various mechanical means such as, for example, scraping and bailing. This situation does not prevail however in the removal of hard scales. At present, there is no simple economical satisfactory method generally accepted by the industry for removing hard sulfate scale. The insolubility of the hard scale in acid renders acid treatment ineffective and the physical hardness of these deposits prohibits effective use of mechanical means.

The use of strong alkali solutions for the treatment of sulfate scales has been proposed. Under certain favorable conditions of temperature and time concentrated alkali solutions will, in some cases, provide a break-up of the scale after long periods of treatment. It has been claimed that solutions of sodium and potassium hydroxide will effectively remove sulfate scale. If, for example, a calcium sulfate scale is treated with concentrated potassium hydroxide for comparatively long periods of time, say from 24 to 72 hours, a white, fluffy precipitate of calcium hydroxide will be formed. This deposit or precipitate may then be bailed from the well by mechanical means. Such a method is obviously undesirable in that considerable periods of time are involved and the use of mechanical bailing apparatus is both expensive, and in some cases, either undesirable or mechanically impossible.

It is, accordingly, an object of this invention to provide an improved method for the removal of sulfate scale from gas and oil well tubing and the strata surrounding such tubing.

It is another object of this invention to provide an improved treating method for hard scale removal which does not require the utilization of expensive mechanical equipment or sustained periods of treatment.

Another object of this invention is to provide an improved method for chemically treating hard scales to permit substantially complete solvent removal.

It is a further object of this invention to treat sulfate scale deposits in a manner that will effect their complete removal and minimize the reoccurrence of such scale deposit.

A still further object of this invention is to provide reagents for removing sulfate scale under a variety of conditions in a more efficient manner and at considerably less expense than was heretofore possible.

These and other objects are accomplished according to the method of my invention which is based on the introduction of a quantity of a selected aqueous alkaline metal salt solution or an aqueous solution of an alkaline metal acid salt into the well bore and bore hole containing a calcium sulfate scale deposit. After the introduction of the treating solution into the well tubing, sufficient contact time is allowed to obtain substantially complete reaction between the treating solution and the scale deposit. After this reaction is completed, the reaction product is treated with acid according to known acidizing technique in which a 10–30% acid solution is introduced into the well and allowed to react with the reaction product. The well, after acid treatment, is flushed to remove reacted acid and particles of scale which may have been loosened by the reagent, but not completely dissolved thereby.

In accordance with my invention, aqueous alkali metal salt solutions and preferably the acid salts of these metals are prepared in an amount of from 5 to 50% by weight. I have found that satisfactory results are obtained with solutions of about 10% by weight. Among the solutions which are particularly effective as treating agents are sodium carbonate, sodium bicarbonate, potassium carbonate, potassium bicarbonate, sodium bisulfite and potassium bisulfite. I have also found that ammonium carbonate is effective though solutions of ammonium nitrate and ammonium chloride have comparatively little effect on these hard sulfate scales.

In carrying out the treatment of sulfate scale with a treating solution selected from the group described above, it has been found desirable to carry out the treatment at a comparatively high temperature since reaction of these reagents at higher temperatures is much more effective. In many field operations temperatures of varying degrees may already exist in the bore hole, as for example, wells in the Welch Pool, Dawson County, Texas, have a bore hole temperature varying from 50° to 200° F. When carrying out a sulfate scale treatment according to the method of this invention in the absence of a substantial bore hole temperature, it will be desirable to heat the reactant treating solution to a temperature of above 100° F. prior to its introduction into the well tubing. The treating solution should not be heated above its boiling point however.

Similar to the variations in bottom hole temperatures which exist in producing fields, the composition of the sulfate scale itself varies considerably in different areas. In most fields where sulfate scale deposit occurs, calcium sulfate will comprise approximately 75% of the scale. The remaining 25% of the scale composition will include such components as silica, alumina, metal oxides such as calcium oxide, iron oxide, magnesium oxide, sodium oxide and others, as well as varying proportions of combined water.

A typical scale from the Albaugh No. 1 Well, Welch Pool, Dawson County, Texas, analyzed as follows:

|                        | Percent |
|------------------------|---------|
| Organic and water      | 16.0    |
| $SiO_2$                | 1.7     |
| Magnetic iron oxide    | 1.0     |
| Calcium sulfate        | 79.6    |
| Sodium oxide           | 1.6     |
|                        | 99.9    |

In carrying out the treatment of such scales with the aqueous solutions above described a variety of reactions will take place. For example, when a solution of sodium carbonate is utilized as the treating reagent the reaction with the calcium sulfate scale will be a double decomposition reaction forming sodium sulfate which is water soluble, and calcium carbonate which is acid soluble, and therefore readily removable by conventional acidizing procedures. If the treatment is carried out with an aqueous solution of an acid salt, such as sodium or potassium bicarbonate, it has been found that scale removal can be accomplished in about ⅓ of the time required in the treatment with the normal alkali metal salt, such as sodium or potassium carbonate. The reason for the vastly superior results obtained by utilizing the alkali metal acid salt solutions is believed to be due, in part, to a minimizing of calcium carbonate deposition on the crystal surface of the sulfate scale. This effect is probably due to the presence of the hydrogen ion which seems to inhibit the production of the water insoluble calcium carbonate on the outside surface of the sulfate crystal, thereby permitting more of the reactant to effectively contact the scale surface. The amount of the reagent used in such a treatment will, of course, have a considerable effect on the time required and will be based on the amount of deposit believed to be present. As indicated previously, the amount of deposit varies from field to field, and in some cases, from well to well. The amount present will depend on the period of time since the last treatment and the rate of build-up of deposit peculiar to the well being treated. Other factors, such as the temperature, time of contact, size of the tubing, and concentration of solution, all have considerable influence on the effectiveness of the treatment.

A more complete understanding of my invention will be obtained from the examples which follow:

EXAMPLE I

A sample of 11.7905 grams of sulfate scale taken from the Albaugh No. 1 Well in the Welch Pool, Dawson County, Texas, was treated at 75° F. for 18 hours with 100 ml. of 10% sodium bicarbonate solution. At the end of this time, the solution was filtered, washed with water, and the residue treated with 15% hydrochloric acid until no further action could be observed. At the end of this treatment, the remaining residue was collected, washed with water and dried in an oven at 100° C. to constant weight. After this treatment, 0.5897 grams of scale remained. This represents a loss of 95%.

EXAMPLE II

A sample of 11.1209 grams of scale from the source described in I above was treated at a temperature of 75° F. for 18 hours with 100 ml. of a 12% by weight sodium bicarbonate solution. At the end of this time, the solution was filtered, washed with water, and the residue treated with 15% hydrochloric acid until no further reaction could be observed. At the end of this treatment, the remaining residue was collected, washed with water, and dried in an oven of 100° C. to constant weight. After this treatment, 0.5671 grams of scale remained. This represents a loss of 94.9%.

EXAMPLE III

In another experiment, a 9.5278 gram sample of scale from the Albaugh No. 1 Well was treated with 100 ml. of 10% sodium bicarbonate solution for 1 hour at 150° C. At the end of this time, the solution was filtered, washed with water and the residue treated with 15% hydrochloric acid until no further reaction could be observed. At the end of this treatment, the remaining residue was collected, washed with water, and dried in an oven at 100° C. to constant weight. The final weight was 1.1970 grams or a weight loss of 87.4%.

EXAMPLE IV

To 9.5278 grams of scale from the Albaugh No. 1 Well 100 ml. of 10% sodium sulfite were added and the mixture was allowed to stand for 18 hours at 75° F. At the end of this time, the sample was filtered and the precipitate was treated with 15% hydrochloric acid until no further reaction could be observed. The residue was then collected on a filter, washed, dried in an oven at 100° C. to constant weight and weighed. The final weight was 1.1970 or a weight loss of 83.4%.

From the foregoing, it will be apparent that treatment of sulfate scale, according to the method of my invention, provides substantially complete dissolution and removal of scale. Removal by way of solvent action was substantially complete in all of the foregoing examples. The degree of effectiveness depends on the particular reagent used as will be evident from Table I, hereinafter shown and described, wherein comparative data on the effectiveness of several reagents is provided.

In carrying out my method of treatment in the field, the reagent solution is prepared by dissolving the reagent in water in amounts sufficient to react with the amount of scale deposit estimated to be present. I have found for example that if $Na_2CO_3$ is the reagent solution used, one pound of $Na_2CO_3$ will remove approximately one pound of $CaSO_4$ scale. This pound for pound ratio is merely suggestive of course and will not apply for all solutions or reagents.

When utilizing $NaHCO_3$ as the reagent a smaller proportion of reagent to deposit can be used. In determining the amount of reagent required based on the scale estimate, consideration should be given to the bottom hole temperature, concentration of solution desired, period of treatment available, rate of circulation of reagent if circulation is utilized, period of time elapsed since last treatment and other known special considerations peculiar to the well or field undergoing scale removal.

Introduction of the reagent solution into the well may be done in a single injection slug or in measured portions at periodic intervals as desired. While treatment may be carried out in a static system, I have found that circulation of this reagent solution is a more effective way of treating the deposit. During circulation the solution will be filtered through a screen or other means to remove any solid materials broken loose during treatment. If a single slug is used in a static form of treatment I have found it advantageous to follow the introduction or injection of solvent solution with a quantity of oil in order to maintain a pressure on the reagent so that better contact of reagent and scale will be obtained.

When the reaction of solvent or reagent and scale has gone to completion as is evidenced by the formation of a slurry, the well is acidized by standard acidizing methods. The time required to accomplish substantially complete removal or solution of the scale will vary. In the example shown, treatment was carried out in a static system for periods of up to about 18 hours. Treatment in the field with circulation of solution will accomplish removal in considerably shorter periods of time. However, in most cases, treatment must be carried out for at least two hours before any considerable amount of scale will be removed. In carrying out this acid treatment a 10-15% HCl solution is normally used. This concentration can be varied and other acids, such as $H_2SO_4$, may be used equally as well. If desired, the HCl solution may include a small amount of a corrosion inhibitor to minimize its detrimental effect on the well tubing and associated equipment. The acid solution is circulated for a period of time sufficient to convert the reaction product resulting from reagent treating to a soluble salt. In most cases, this reaction will be substantially instantaneous. The soluble salt resulting from acid treating is carried from the well during circulation of the treating acid. After acidizing is complete, the well is flushed to remove any acid remaining by circulating water, brine or a similar cleansing agent.

In addition to the removal of sulfate scale according to the method described, I have found that treatment with a sodium bicarbonate solution after scale removal, by circulating in the well a small amount of bicarbonate solution will cause a build-up of a layer of calcium carbonate on the tube surfaces which inhibits formation of further calcium sulfate crystals. In the event that sulfate scale thereafter deposits on such a surface, it is readily removable by simple acid treatment.

As another feature of my invention, I have found it advantageous in certain areas to add to the reagent solution a small amount of a wetting additive. The objective in adding such a composition is twofold. First, wetting by the treating reagent solution of the oil wet surface of the scale deposit will be accomplished, and secondly, the additive will help to reduce the layer of non-reactive calcium carbonate which forms on the crystal surfaces of the sulfate scale during the course of reaction. It has been found, for example, that Versene (tetra sodium salt of ethylene diamine tetra acetic acid) can be used effectively for this purpose. When utilized along with sodium carbonate, for example, Versene functions by replacement of two of the sodium atoms of the molecule by a single calcium atom of the scale, thus forming a water soluble ring structure. Other wetting agents of the detergent type, such as Tween 80 (polyoxyalkylene sorbitan monooleate), may also be used.

The effectiveness of treating or removing calcium sulfate deposits from tubing and bore holes according to the method of this invention as compared to prior methods, particularly those utilizing concentrated caustic solutions, will be apparent from Table I following. In this table the scale treated was similar to that used in the foregoing examples, namely, scale taken from the Albaugh No. 1 Well, Welch Pool, Dawson County, Texas. All samples were treated for 16 hours at 75° F. followed by acidizing with 15% HCl, washing and drying at 100° C. to constant weight. The results of the comparative runs are as follows:

Table I

| | Salt Used | Wt. Percent Solution | Grams Scale | Grams Residue | Loss | |
|---|---|---|---|---|---|---|
| | | | | | Grams | Percent |
| (1) | $NaHSO_3$ | 10 | 9.8529 | 2.0700 | 7.7829 | 79.0 |
| (2) | $Na_2HPO_4$ | 10 | 11.9495 | 11.9406 | 0.0089 | Nil |
| (3) | $NaH_2PO_4$ | 10 | 11.5642 | 11.5476 | 0.0166 | Nil |
| (4) | $NH_4NO_3$ | 10 | 11.2642 | 11.2598 | 0.0044 | Nil |
| (5) | $NH_4CO_3$ | 10 | 9.7648 | 0.3998 | 9.3650 | 96.0 |
| (6) | $NaOH$ | 50 | 11.6621 | 11.4701 | 0.1920 | 1.6 |
| (7) | $NaOH$ | 50 | 49.8545 | 49.0010 | 0.8535 | 1.7 |
| (8) | $KOH$ | 50 | 11.8962 | 11.6520 | 0.2442 | 2.0 |
| (9) | $KOH$ | 50 | 51.1863 | 49.9994 | 1.1869 | 2.3 |
| (10) | $NH_4NO_3$ | 10 | 9.6266 | 9.6160 | 0.0106 | Nil |
| (11) | $NH_4Cl$ | 10 | 11.1622 | 11.0519 | 0.0103 | Nil |
| (12) | $Na_2SO_4$ | 20 | 11.9671 | 11.9595 | 0.0076 | Nil |
| (13) | $NaHCO_3$ | 10 | 11.7905 | 0.5897 | 11.7905 | 95.0 |
| (14) | $K_2CO_3$ | 10 | 9.8660 | 0.9980 | 8.8680 | 89.8 |

It will be noted that in runs 6, 7, 8 and 9 utilizing sodium and potassium hydroxide, respectively, little if any, calcium sulfate scale removal was effected. In run 13, however, which is taken from Example I, 95% of the sulfate scale was removed when treated according to the method of my invention.

Treatment of oil and gas wells, according to the method described, accomplishes removal of hard sulfate scales in a more efficient manner than was heretofore possible. Considerable savings have resulted from the use of the comparatively inexpensive salt solutions herein described. Moreover, substantially complete removal of the sulfate scale is obtained in a much shorter treating time and without the necessity of expensive mechanical equipment. I have also found that treatment with the solutions defined after scale removal substantially inhibits the redeposit of new scale, or in those cases where some scale formation does occur, simple acidizing will effectively remove such deposit.

I claim as my invention:

1. The method of increasing oil production by the removal of calcium sulfate scale from well tubing and the surrounding bore hole which comprises introducing into said bore hole a hot aqueous solution of sodium bicarbonate of between about 10 to 20% by weight, maintaining said solution in the bore hole for a sufficient time to convert the calcium sulfate present to calcium carbonate, introducing a quantity of 10% HCl into said bore hole in an amount sufficient to dissolve all of the calcium carbonate present in said hole, flushing said acid from the well, circulating a second solution of sodium bicarbonate in said well in an amount sufficient to build-up a layer of calcium carbonate on the well tubing so as to minimize the formation of calcium sulfate scale on said tubing, and intermittently thereafter circulating a dilute acid solution through the well tubing and surrounding borehole to prevent formation of calcium sulfate scale.

2. The method of increasing oil production by the removal of calcium sulfate scale from well tubing and surrounding bore hole, as claimed in claim 1, wherein the period of contact between the treating solution and the scale deposit is at least two hours.

3. The method of increasing oil production by the removal of calcium sulfate scale from well tubing and surrounding bore hole, as claimed in claim 1, wherein bottom hole temperature is maintained at at least 100° F.

References Cited in the file of this patent

UNITED STATES PATENTS

| | | |
|---|---|---|
| 1,984,668 | Weir et al. | Dec. 18, 1934 |
| 2,001,350 | Mills | May 14, 1935 |
| 2,140,183 | Bresler | Dec. 13, 1938 |
| 2,161,085 | Phalen | June 6, 1939 |
| 2,386,605 | Harton et al. | Oct. 9, 1945 |